(12) United States Patent
Yan et al.

(10) Patent No.: US 12,106,009 B2
(45) Date of Patent: Oct. 1, 2024

(54) TECHNOLOGIES FOR FRAMEWORK-LEVEL AUDIO DEVICE VIRTUALIZATION

(71) Applicant: Intel Corporation, Santa Clara, CA (US)

(72) Inventors: Shoumeng Yan, Beijing (CN); Yuan Wu, Shanghai (CN); Dahai Kou, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 17/020,531

(22) Filed: Sep. 14, 2020

(65) Prior Publication Data
US 2021/0064333 A1  Mar. 4, 2021

Related U.S. Application Data

(63) Continuation of application No. 15/083,954, filed on Mar. 29, 2016, now Pat. No. 10,776,072.

(51) Int. Cl.
*G06F 3/16* (2006.01)
(52) U.S. Cl.
CPC .................. *G06F 3/165* (2013.01)
(58) Field of Classification Search
CPC ........................................ G06F 3/165
USPC ......................................... 700/94
See application file for complete search history.

(56) References Cited

U.S. PATENT DOCUMENTS

| | | | |
|---|---|---|---|
| 5,703,794 A * | 12/1997 | Heddle | G06F 3/165 |
| | | | 370/522 |
| 5,768,126 A | 6/1998 | Frederick | |
| 6,216,173 B1 | 4/2001 | Jones et al. | |
| 7,706,903 B2 | 4/2010 | Champion et al. | |
| 9,118,293 B1 * | 8/2015 | Zelenov | H03G 5/005 |

(Continued)

OTHER PUBLICATIONS

United States Patent and Trademark Office, "Non-Final Office Action," issued in connection with U.S. Appl. No. 15/083,954, dated Jul. 25, 2019, 12 pages.

(Continued)

*Primary Examiner* — Joseph Saunders, Jr.
(74) *Attorney, Agent, or Firm* — Hanley, Flight & Zimmerman, LLC

(57) ABSTRACT

Technologies for framework-level audio device virtualization include a computing device that executes multiple application framework instances. The computing device monitors for an application framework instance switch and, in response to an application framework instance switch, determines whether the current application framework instance is in the foreground. If in the foreground, the computing device selects a physical audio output device. The computing device may output audio data associated with the current application framework instance using a kernel audio driver associated with the physical audio output device. If not in the foreground, the computing device selects a null audio output device using a null audio hardware abstraction layer (HAL). The null audio HAL may sleep for the duration of audio data associated with the current application framework instance. The null audio HAL may be an operating-system- and device-independent shared library of the computing device. Other embodiments are described and claimed.

28 Claims, 3 Drawing Sheets

(56) References Cited

U.S. PATENT DOCUMENTS

| | | |
|---|---|---|
| 10,776,072 B2 | 9/2020 | Yan et al. |
| 2002/0032753 A1 | 3/2002 | Stoltz et al. |
| 2002/0107594 A1 | 8/2002 | Taylor et al. |
| 2006/0005201 A1 | 1/2006 | Puryear |
| 2006/0023900 A1 | 2/2006 | Erhart et al. |
| 2007/0266168 A1 | 11/2007 | Sampat et al. |
| 2013/0067050 A1* | 3/2013 | Kotteri .................. G06F 3/165 709/223 |
| 2013/0167027 A1 | 6/2013 | Adolph et al. |
| 2013/0198367 A1* | 8/2013 | Abraham ............. G06F 9/5088 709/224 |
| 2014/0093101 A1 | 4/2014 | Lee et al. |
| 2014/0115580 A1 | 4/2014 | Kellerman et al. |
| 2015/0160976 A1 | 6/2015 | Kim et al. |
| 2015/0347748 A1 | 12/2015 | Krstic et al. |
| 2015/0363155 A1 | 12/2015 | Hayashi et al. |

OTHER PUBLICATIONS

United States Patent and Trademark Office, "Final Office Action," issued in connection with U.S. Appl. No. 15/083,954, dated Jan. 23, 2020, 14 pages.

United States Patent and Trademark Office, "Advisory Action," issued in connection with U.S. Appl. No. 15/083,954, dated Mar. 16, 2020, 2 pages.

United States Patent and Trademark Office, "Notice of Allowance," issued in connection with U.S. Appl. No. 15/083,954, dated Apr. 16, 2020, 6 pages.

* cited by examiner

TECHNOLOGIES FOR FRAMEWORK-LEVEL AUDIO DEVICE VIRTUALIZATION

RELATED APPLICATION

This patent arises from a continuation of U.S. patent application Ser. No. 15/083,954, (Now U.S. Pat. No. 10,776,072) which was filed on Mar. 29, 2016. U.S. patent application Ser. No. 15/083,954 is hereby incorporated herein by reference in its entirety. Priority to U.S. patent application Ser. No. 15/083,954 is hereby claimed.

BACKGROUND

Many modern computing devices are capable of executing multiple operating systems simultaneously. Typical computing devices may use virtualization to execute multiple guest operating systems under the control of a virtual machine monitor and/or hypervisor. Virtualization solutions typically require execution of multiple complete operating systems and may require potentially expensive virtualization of hardware resources. Thus, virtualization solutions may be relatively resource-intensive, particularly for resource-constrained computing devices such as smart phones and other mobile devices. Techniques for concurrent isolated execution of application routines using relatively minimal processing and storage resources are described in International Application Publication Number WO 2015/089730, by Shoumeng Yan, and entitled Techniques for Portable Computing Device Virtualization. In the system described by the Yan reference, peripheral device I/O data is discarded for background instances.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
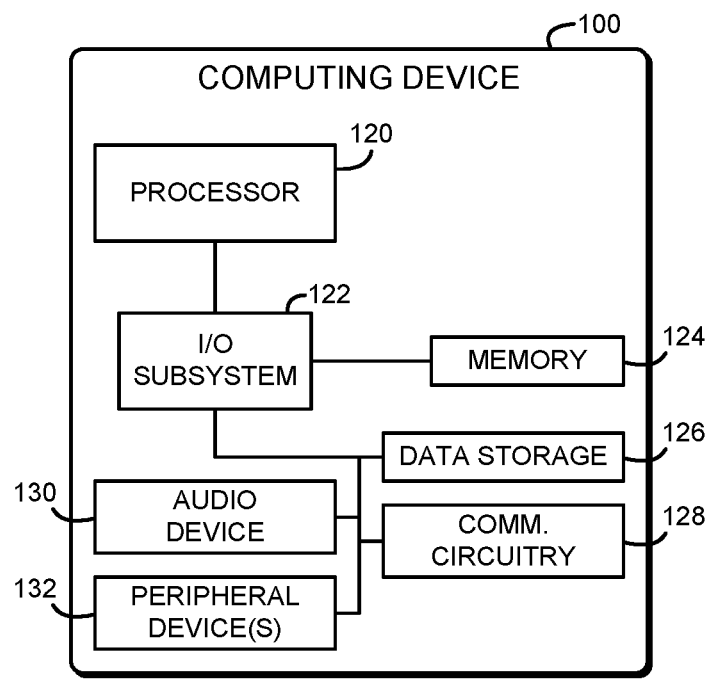
FIG. 1 is a simplified block diagram of at least one embodiment of a computing device for framework-level audio device virtualization.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Referring now to FIG. 1, in an illustrative embodiment, a computing device 100 for framework-level audio device virtualization includes one or more audio output devices. The computing device 100 executes and switches between multiple application framework instances. The computing device 100 may execute a single foreground application framework instance (e.g., an instance visible to a user), with the other application framework instances in the background (e.g., invisible to the user). When the computing device 100 switches between application frameworks, audio output for background instances is routed to a null audio output device hardware abstraction layer (HAL) and audio output for the foreground instance is routed to a physical audio device HAL. By doing so, the computing device 100 may provide the performance benefits of framework-level audio device virtualization without audible glitches or other switching artifacts, which may improve the user experience. Additionally, the computing device 100 may re-use existing audio hardware drivers, and the null audio output device HAL may be implemented as a hardware-independent code module. Thus, the computing device 100 may support audio device virtualization in a hardware-independent fashion.

The computing device 100 may be embodied as any type of computation or computer device capable of performing the functions described herein, including, without limitation, a computer, a smartphone, a mobile computing device, a tablet computer, a wearable computing device, a desktop computer, a laptop computer, a notebook computer, a server, a workstation, a network appliance, a web appliance, a distributed computing system, a processor-based system, and/or a consumer electronic device. As shown in FIG. 1, the computing device 100 illustratively includes a processor 120, an input/output subsystem 122, a memory 124, a data storage device 126, and communication circuitry 128. Of course, the computing device 100 may include other or additional components, such as those commonly found in a smartphone (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication circuitry 128 of the computing device 100 may be embodied as any communication circuit, device, or collection thereof, capable of enabling communications between the computing device 100 and other remote devices over a network. The communication circuitry 128 may be configured to use any one or more communication technology (e.g., wired or wireless communications) and associated protocols (e.g., Ethernet, Bluetooth®, Wi-Fi®, WiMAX, etc.) to effect such communication.

The computing device 100 may also include one or more audio devices 130 and one or more peripheral devices 132. Each audio device 130 may be embodied as any device capable of generating audio signals for output, such as a paper cone speaker, an audio transducer, an audio output jack, a digital-to-analog converter (DAC), a USB audio device, a Bluetooth® audio device, an audio controller, an audio codec, or other type of audio device. The peripheral devices 132 may include any number of additional input/output devices, interface devices, and/or other peripheral devices. For example, in some embodiments, the peripheral devices 132 may include a touch screen, graphics circuitry, game controller, keyboard, mouse, speaker system, microphone, network interface, and/or other input/output devices, interface devices, and/or peripheral devices.

Figure 2:
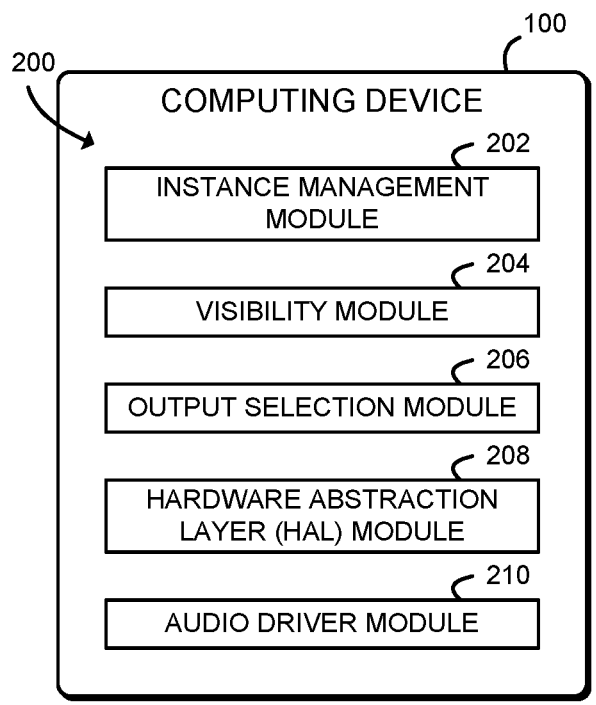
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes an instance management module 202, a visibility module 204, an output selection module 206, a hardware abstraction layer (HAL) module 208, and an audio driver module 210. The various modules of the environment 200 may be embodied as hardware, firmware, software, or a combination thereof. As such, in some embodiments, one or more of the modules of the environment 200 may be embodied as circuitry or collection of electrical devices (e.g., instance management circuitry 202, visibility circuitry 204, output selection circuitry 206, HAL circuitry 208, and/or audio driver circuitry 210). It should be appreciated that, in such embodiments, one or more of the instance management circuitry 202, the visibility circuitry 204, the output selection circuitry 206, the HAL circuitry 208, and/or the audio driver circuitry 210 may form a portion of one or more of the processor 120, the I/O subsystem 122, and/or other components of the computing device 100. Additionally, in some embodiments, one or more of the illustrative modules may form a portion of another module and/or one or more of the illustrative modules may be independent of one another.

The instance management module 202 is configured to execute multiple application framework instances and monitor for switching between the executing application framework instances. The instance management module 202 may be further configured to execute an operating system kernel that executes the application framework instances. The visibility module 204 is configured to determine whether a current application framework instance of the executing application framework instances is the foreground instance in response to an application framework instance switch.

The output selection module 206 is configured to select a physical audio output device 130 in response to determining that the current application framework instance is the foreground instance and to select a null audio output device in response to determining that the current application framework instance is not the foreground instance. Selecting the null audio output may include activating a null audio hardware abstraction layer (HAL), which may be embodied as an audio-hardware-independent shared library of the computing device 100.

The HAL module 208 is configured to output, with the physical audio output device 130, audio data associated with the current application framework in response to selecting the physical audio output device 130 and to sleep for the duration of the audio data in response to selecting the null audio output device. The audio driver module 210 is configured to output the audio data associated with the current application framework with a kernel audio driver associated with the physical audio output device 130. The null audio HAL may be embodied as a shared library of the computing device 100 that is independent from the kernel audio driver.

Figure 3:
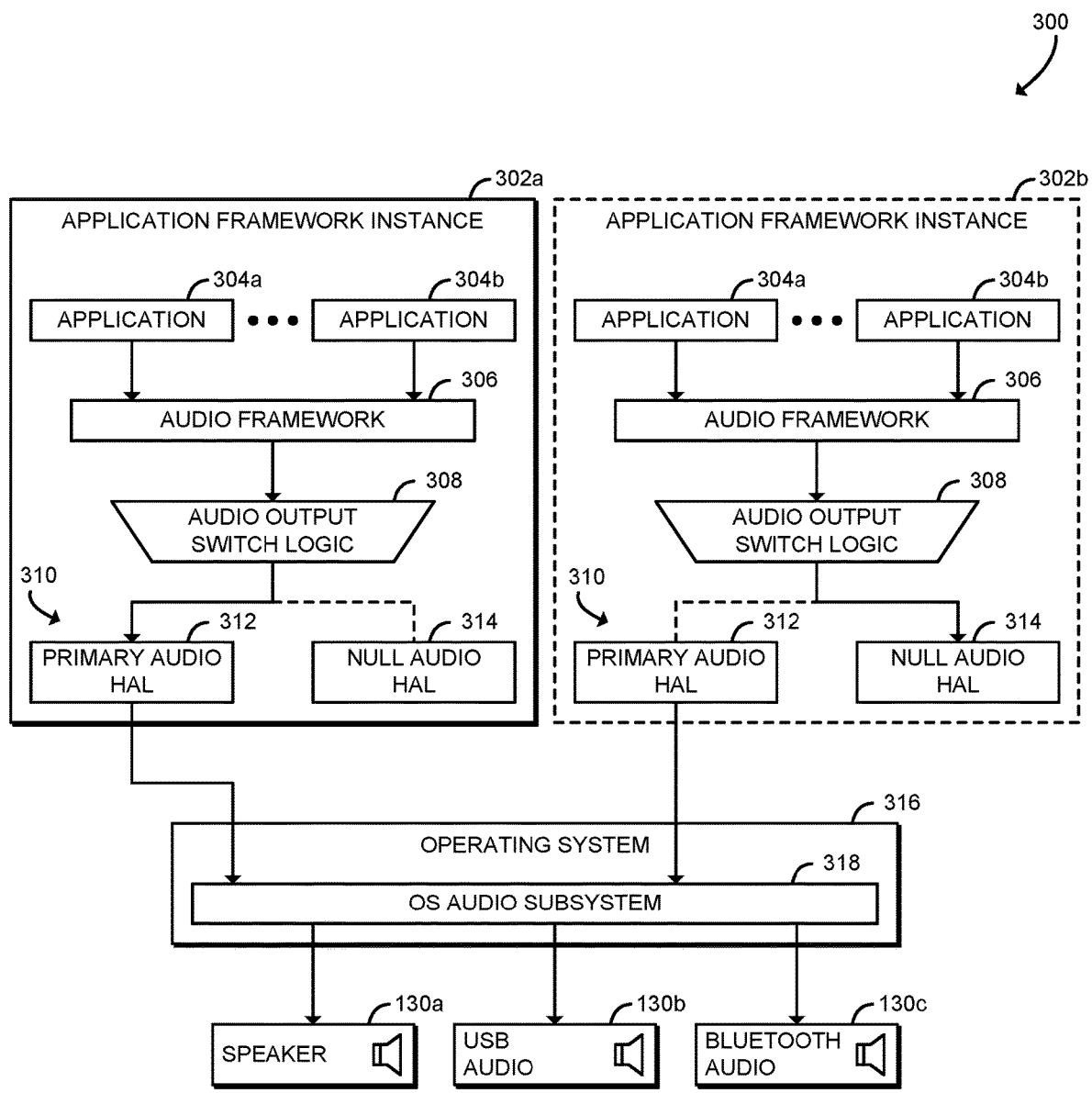
FIG. 3 is a simplified block diagram of at least one embodiment of a system architecture that may be established by the computing device of FIGS. 1-2.

Referring now to FIG. 3, in an illustrative embodiment, the computing device 100 establishes a system architecture 300 during operation. The illustrative system architecture 300 includes multiple application framework instances 302 and an operating system 316. As shown, each application framework instance 302 includes one or more applications 304, an audio framework 306, audio output switch logic 308, a primary hardware abstraction layer (HAL) 312, and a null audio HAL 314. Also as shown, the operating system 316 includes an operating system audio subsystem 318.

Each application 304 accesses the audio framework 306 to output audio data. Each application 304 may be embodied as high-level code executed within a managed execution environment. For example, in some embodiments, application 304 may be embodied as an Android™ application that uses one or more application programming interfaces (APIs), such as android.media, to interface with the audio framework 306. The audio framework 306 provides audio services to the applications 304, including providing one or more APIs, processing associated API calls, and performing other audio services. The audio framework 306 may be embodied as managed and/or native code, including one or more media servers, native code frameworks, and/or native code interfaces.

As illustrated, the audio framework 306 interfaces with one or more hardware abstraction layers (HALs) 310 to output audio data. Each HAL 310 (e.g., the primary audio HAL 312, the null audio HAL 314, and/or other HALs 310) may be embodied as a native code shared library that provides a standardized, abstracted interface to an audio device. Each HAL 310 may respond to calls from the audio framework 306 by interacting with an underlying audio driver provided by the operating system 316. The audio output switch logic 308 may allow audio data to be routed to various HALs 310, including to the primary audio HAL 312 and/or the null audio HAL 314. For example, in some embodiments, the audio output switch logic 308 may be used to switch audio output from an internal speaker 130 of the computing device to a Bluetooth headset by switching between associated HALs 310.

The operating system 316 may be embodied as any management component of the computing device 100. The operating system 316 may include any combination of user- and/or root-level components, including managed and/or native code. For example, in some embodiments the operating system 316 may include Android operating system frameworks and/or support libraries as well as a Linux® kernel and associated kernel modules. As shown, the operating system 316 includes an audio subsystem 318. The audio subsystem 318 may include kernel audio drivers, kernel modules, system call interfaces, and/or other components used to control one or more audio devices 130 of the computing device 100. For example, the audio subsystem 318 may be embodied as an Advanced Linux Sound Architecture (ALSA) audio subsystem, an Open Sound System (OSS) audio subsystem, or any other system-level, native audio subsystem of the computing device 100. As shown, each HAL 310 used to output audio (e.g., the primary audio HAL 312) may interface with the audio subsystem 318 to output audio. Thus, each HAL 310 may be used to abstract away differences associated with various audio subsystems 318. In the illustrative embodiment, the audio subsystem 318 interfaces with an internal speaker 130*a*, a USB audio device 130*b*, and a Bluetooth audio device 130*c*; however, it should be understood that different audio devices 130 may be included in other embodiments.

In use, as described above, one of the application framework instances 302 may be in the foreground (e.g., visible to the user), and the other application framework instances 302 may be in the background (e.g., not visible to the user). For example, in the illustrative embodiment, the application framework instance 302*a* is in the foreground and the application framework instance 302*b* is in the background. FIG. 3 illustrates the flow of audio data between various components of the system architecture 300. As shown, for the foreground instance 302*a*, audio data may flow from the applications 304 to the audio framework 306 and then to the primary audio HAL 312. The primary audio HAL 312 provides the audio data to the audio subsystem 318, which may output the audio data to one or more of the audio devices 130*a*, 130*b*, 130*c*. As shown for the background instance 302*b*, audio data may flow from the applications 304 to the audio framework 306 and then to the null audio HAL 314. The null audio HAL 314 does not pass along the audio data to the audio subsystem 318; thus, the audio produced by the background instance 302*b* may not be output to any audio device 130. Additionally, although illustrated as including two application framework instances 302*a*, 302*b*, it should be understood that the system architecture 300 may include any number of additional application framework instances 302. In those embodiments, only one of the instances 302 may be in the foreground, with the remainder in the background, routing audio data to the null audio HAL 314.

Figure 4:
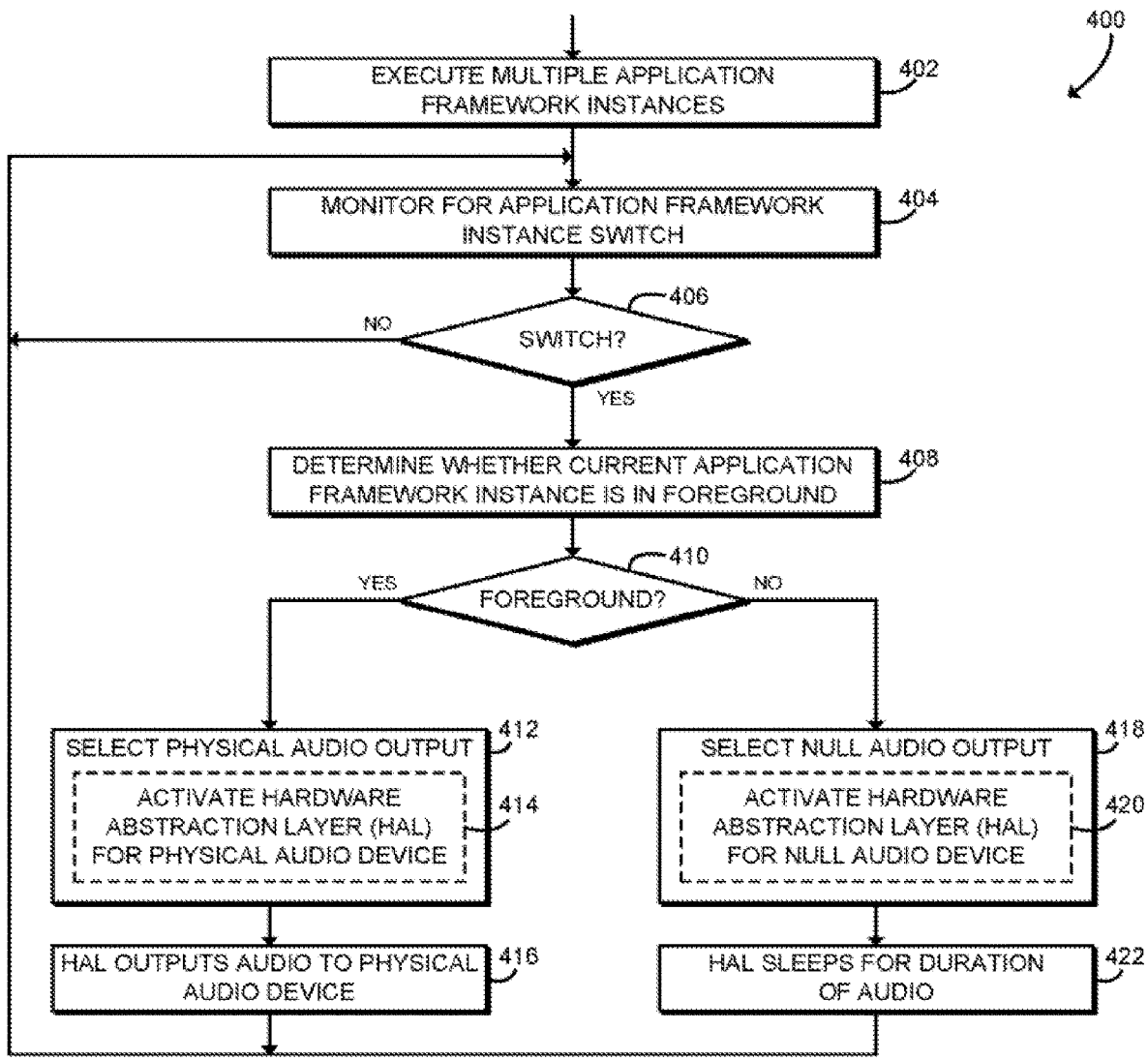
FIG. 4 is a simplified flow diagram of at least one embodiment of a method for framework-level audio device virtualization that may be executed by the computing device of FIGS. 1-3.

Referring now to FIG. 4, in use, the computing device 100 may execute a method 400 for framework-level audio device virtualization. The method 400 begins with block 402, in which the computing device 100 executes multiple application framework instances 302. Each application framework instance 302 may be embodied as an isolated, user-level software framework. Thus, each application framework instance 302 may include isolated instantiations of libraries, applications, services, processes, managed execution environments, and/or other user-level code associated with an application framework. In particular, the computing device 100 may execute multiple instances 302 of an Android application framework. Each instance 302 includes a corresponding audio framework 306 and audio output switch logic 308. In use, each instance 302 may execute one or more applications 304, and each application 304 may output audio data using the corresponding audio framework 306.

In block 404, the computing device 100 monitors for an application framework instance 302 switch. An application framework instance 302 switch may occur when a new application framework instance 302 is brought to the foreground of the user interface of the computing device 100 or otherwise made active. In the illustrative embodiment, at most one application framework instance 302 may be in the foreground at any given time. An application framework instance 302 switch may occur in response to, for example, a user selection made in an application or other graphical user interface of the computing device 100. Continuing that example, the user may cause an application framework instance 302 switch by tapping, clicking, or otherwise selecting a user interface object to cause the particular application framework instance 302 to be activated. The computing device 100 may use any appropriate technique to monitor for application framework instance 302 switches. For example, in some embodiments, the operating system 316 or other management component of the computing device 100 may deliver an appropriate event to each application framework instance 302 in response to an application framework instance 302 switch. Additionally or alternatively, in some embodiments each application framework instance 302 may poll or otherwise query the operating system 316 or other management component for application framework instance 302 switches. In block 406, the computing device 100 determines whether an application framework instance 302 switch has occurred. If not, the method 400 loops back to block 404 to continue monitoring for application framework instance 302 switches. If an application framework instance 302 switch has occurred, the method 400 advances to block 408.

In block 408, the computing device 100 determines whether the current application framework instance 302 is in the foreground or has otherwise been activated. The computing device 100 may use any appropriate technique to determine whether the current application framework instance 302 is in the foreground. For example, in some embodiments, the operating system 316 or other management component of the computing device 100 may maintain status data identifying the foreground application framework instance 302. Each application framework instance 302 may query the operating system 316 to determine whether the current application framework instance 302 is in the foreground. Additionally or alternatively, in some embodiments the operating system 316 may inform the application framework instance 302 whether it is in the foreground, for example by supplying one or more event objects or other parameters with an instance switch event. In block 410, the computing device 100 checks whether the current application framework instance 302 is in the foreground. If not, the method 400 branches to block 418, described below. If the current application framework instance 302 is in the foreground, the method 400 branches to block 412.

In block 412, the computing device 100 selects a physical audio device 130 for audio output from the current application framework instance 302. The computing device 100 may direct audio output to the audio device 130 requested by the current application framework instance 302 (e.g., by one or more of the current applications 304, by the audio framework 306, or by other components of the application framework instance 302). The computing device 100 may use the ordinary audio output switch logic 308 of the current application framework instance 302 to select the audio device 130. For example, the computing device 100 may direct the audio output switch logic 308 to select an appropriate audio endpoint for output to a physical audio device 130. In some embodiments, in block 414, the computing device 100 may activate a hardware abstraction layer (HAL) 310 for the associated physical audio device 130. A HAL 310 may be embodied as a user-level shared library or other code module that acts as an interface between the audio framework 306 of the current application framework instance 302 and the underlying audio subsystem 318 of operating system 316. For example, as shown in FIG. 3, when the application framework instance 302a switches to the foreground, the audio output switch logic 308 may select the primary audio HAL 312, which interfaces with the operating system audio subsystem 318 to output audio data to a physical audio device 130 (e.g., the internal speaker 130a). Of course, in other embodiments, the audio output switch logic 308 may select a HAL 310 associated with a different physical audio device such as the USB audio device 130b and/or the Bluetooth audio device 130c.

In block 416, after being selected, the activated HAL 310 (e.g., the primary audio HAL 312) outputs audio to the physical audio device 130. The HAL 310 may, for example, receive audio data from the audio framework 306 and output the audio data using the audio subsystem 318 of the operating system 316. The activated HAL 310 may interact with a kernel audio driver or other components of the audio subsystem 318. Thus, the activated HAL 310 may depend on various interfaces or other components of the audio subsystem 318 for proper operation. Thus, in some embodiments, the computing device 100 may include a different HAL 310 for each supported audio device 130 and/or audio subsystem 318 of the computing device 100. The HAL 310 may continue to output data produced by the applications 304 while the current application framework instance 302 remains in the foreground or otherwise activated. After activating the HAL 310, the method 400 loops back to block 404 to continue monitoring for application framework instance 302 switches.

Referring back to block 410, if the current application framework instance 302 is not in the foreground, the method 400 branches to block 418. In block 418, the computing device 100 selects a null audio output for the audio framework 306. After selecting the null audio output, the computing device 100 does not output the audio produced by applications 304 of the current application framework instance 302 to any physical audio device 130. The computing device 100 may use the ordinary audio output switch logic 308 of the current application framework instance 302 to select the null audio output. In some embodiments, in block 420 the computing device 100 may activate a HAL 310 for a null audio device (e.g., the null audio HAL 314). For example, as shown in FIG. 3, when the application framework instance 302b switches to the background, the audio output switch logic 308 may select the null audio HAL 314. The null audio HAL 314 may be embodied as a user-level shared library or other code module that interfaces with the audio framework 306. However, the null audio HAL 314 does not output audio data to a physical audio device 130 and may not interface with the audio subsystem 318 of the operating system 316. Thus, the null audio HAL 314 may be independent of the particular audio device 130, audio subsystem 318, and/or operating system 316 used by the computing device 100. In other words, the same null audio HAL 314 may be re-used for different audio devices 130 and/or audio subsystems 318 without modification.

In block 422, after being selected, the null audio HAL 314 sleeps for the duration of audio provided by the audio framework 306. In other words, rather than outputting audio data using a physical audio device 130, the null audio HAL 314 sleeps or otherwise yields execution of the processor 120 for the duration of time associated with the audio data. Thus, the operation of the null audio HAL 314 is transparent to the audio framework 306 and/or the applications 304. In other words, the applications 304 and the audio framework 306 of the background application framework instance 302 may continue to produce audio data without interruption while the application framework instance 302 is in the background. Thus, the computing device 100 may avoid buffer underruns and overruns in the audio data stream and, accordingly, may avoid audible glitches or other artifacts associated with switching between application framework instances 302. After activating the null audio HAL 314, the method 400 loops back to block 404 to continue monitoring for application framework instance 302 switches.

As illustrated in FIG. 4, an instance of the method 400 may be executed by each of the application framework instances 302 concurrently. For example, each application framework instance 302 may monitor for application framework instance 302 switches and switch between a physical audio HAL 310 and the null audio HAL 314 as that application framework instance 302 enters and exits the foreground. It should be understood that in other embodiments, the operations of the method 400 may be performed by other components of the computing device 100 or in a different order. For example, in some embodiments, the computing device 100 may execute a centralized instance of the method 400 (e.g., within the operating system 316) to monitor and respond to application framework instance 302 switches. In those embodiments, the method 400 executed by the operating system 316 may control switching between a physical audio HAL 310 and the null audio HAL 314 for each application framework instance 302 of the computing device 100. Additionally or alternatively, in some embodiments, the operations of the method 400 may be performed by both the operating system 316 and the application framework instances 302.

It should be appreciated that, in some embodiments, the method 400 may be embodied as various instructions stored on a computer-readable media, which may be executed by the processor 120, a peripheral device 132, and/or other components of the computing device 100 to cause the computing device 100 to perform the corresponding method 400. The computer-readable media may be embodied as any type of media capable of being read by the computing device 100 including, but not limited to, the memory 124, the data storage device 126, a local memory of the processor 120, other memory or data storage devices of the computing device 100, portable media readable by a peripheral device 132 of the computing device 100, and/or other media.

EXAMPLES

Illustrative examples of the technologies disclosed herein are provided below. An embodiment of the technologies may include any one or more, and any combination of, the examples described below.

Example 1 includes a computing device for multiple audio instances, the computing device comprising an instance management module to (i) execute a plurality of application framework instances and (ii) monitor for an application framework instance switch in response to execution of the plurality of application framework instances; and a visibility module to determine whether a current application framework instance of the plurality of application framework instances is a foreground instance in response to an application framework instance switch; and an output selection module to (i) select a physical audio output device in response to a determination that the current application framework instance is the foreground instance and (ii) select a null audio output device in response to a determination that the current application framework instance is not the foreground instance.

Example 2 includes the subject matter of Example 1, and wherein to select the physical audio output device comprises to select the physical audio output device with an audio output selection logic of the current application framework instance; and to select the null audio output device comprises to select the null audio output device with the audio output selection logic of the current application framework instance.

Example 3 includes the subject matter of any of Examples 1 and 2, and wherein to select the null audio output device comprises to activate a null audio hardware abstraction layer of the computing device.

Example 4 includes the subject matter of any of Examples 1-3, and wherein to activate the null audio hardware abstraction layer comprises to activate an audio-hardware-independent shared library of the computing device.

Example 5 includes the subject matter of any of Examples 1-4, and further comprising a hardware abstraction layer module to output, with the physical audio output device, audio data associated with the current application framework in response to selection of the physical audio output device; and sleep for a duration of the audio data associated with the current application framework in response to a selection of the null audio output device.

Example 6 includes the subject matter of any of Examples 1-5, and wherein the physical audio device comprises a speaker.

Example 7 includes the subject matter of any of Examples 1-6, and wherein the physical audio device comprises a universal serial bus audio interface.

Example 8 includes the subject matter of any of Examples 1-7, and wherein the physical audio device comprises a Bluetooth audio interface.

Example 9 includes the subject matter of any of Examples 1-8, and wherein to execute the plurality of application framework instances comprises to execute a plurality of managed execution environments, wherein each of the application framework instances corresponds to a managed execution environment.

Example 10 includes the subject matter of any of Examples 1-9, and wherein the instance management module is further to execute an operating system kernel; and to execute the plurality of application framework instances comprises to execute the plurality of application framework instances by the operating system kernel.

Example 11 includes the subject matter of any of Examples 1-10, and further comprising an audio driver module to output, in response to selection of the physical audio output device, audio data associated with the current application framework with a kernel audio driver associated with the physical audio output device.

Example 12 includes the subject matter of any of Examples 1-11, and wherein to select the null audio output device comprises to activate a null audio hardware abstraction layer of the computing device, wherein the null audio hardware abstraction layer comprises a shared library of the computing device that is independent from the kernel audio driver.

Example 13 includes a method for multiple audio instances, the method comprising executing, by a computing device, a plurality of application framework instances; monitoring, by the computing device, for an application framework instance switch in response to executing the plurality of application framework instances; determining, by the computing device, whether a current application framework instance of the plurality of application framework instances is a foreground instance in response to an application framework instance switch; selecting, by the computing device, a physical audio output device in response to determining that the current application framework instance is the foreground instance; and selecting, by the computing device, a null audio output device in response to determining that the current application framework instance is not the foreground instance.

Example 14 includes the subject matter of Example 13, and wherein selecting the physical audio output device comprises selecting the physical audio output device with an audio output selection logic of the current application framework instance; and selecting the null audio output device comprises selecting the null audio output device with the audio output selection logic of the current application framework instance.

Example 15 includes the subject matter of any of Examples 13 and 14, and wherein selecting the null audio output device comprises activating a null audio hardware abstraction layer of the computing device.

Example 16 includes the subject matter of any of Examples 13-15, and wherein activating the null audio hardware abstraction layer comprises activating an audio-hardware-independent shared library of the computing device.

Example 17 includes the subject matter of any of Examples 13-16, and further comprising outputting, by the computing device with the physical audio output device, audio data associated with the current application framework in response to selecting the physical audio output device; and sleeping, by the computing device, for a duration of the audio data associated with the current application framework in response to selecting the null audio output device.

Example 18 includes the subject matter of any of Examples 13-17, and wherein the physical audio device comprises a speaker.

Example 19 includes the subject matter of any of Examples 13-18, and wherein the physical audio device comprises a universal serial bus audio interface.

Example 20 includes the subject matter of any of Examples 13-19, and wherein the physical audio device comprises a Bluetooth audio interface.

Example 21 includes the subject matter of any of Examples 13-20, and wherein executing the plurality of application framework instances comprises executing a plurality of managed execution environments, wherein each of the application framework instances corresponds to a managed execution environment.

Example 22 includes the subject matter of any of Examples 13-21, and further comprising executing, by the computing device, an operating system kernel; wherein executing the plurality of application framework instances comprises executing the plurality of application framework instances by the operating system kernel.

Example 23 includes the subject matter of any of Examples 13-22, and further comprising outputting, by the computing device in response to selecting the physical audio output device, audio data associated with the current application framework with a kernel audio driver associated with the physical audio output device.

Example 24 includes the subject matter of any of Examples 13-23, and wherein selecting the null audio output device comprises activating a null audio hardware abstraction layer of the computing device, wherein the null audio hardware abstraction layer comprises a shared library of the computing device that is independent from the kernel audio driver.

Example 25 includes a computing device comprising a processor; and a memory having stored therein a plurality of instructions that when executed by the processor cause the computing device to perform the method of any of Examples 13-24.

Example 26 includes one or more machine readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a computing device for multiple audio instances, the computing device comprising means for executing a plurality of application framework instances; means for monitoring for an application framework instance switch in response to executing the plurality of application framework instances; means for determining whether a current application framework instance of the plurality of application framework instances is a foreground instance in response to an application framework instance switch; means for selecting a physical audio output device in response to determining that the current application framework instance is the foreground instance; and means for selecting a null audio output device in response to determining that the current application framework instance is not the foreground instance.

Example 29 includes the subject matter of Example 28, and wherein the means for selecting the physical audio output device comprises means for selecting the physical audio output device with an audio output selection logic of the current application framework instance; and the means for selecting the null audio output device comprises means for selecting the null audio output device with the audio output selection logic of the current application framework instance.

Example 30 includes the subject matter of any of Examples 28 and 29, and wherein the means for selecting the null audio output device comprises means for activating a null audio hardware abstraction layer of the computing device.

Example 31 includes the subject matter of any of Examples 28-30, and wherein the means for activating the null audio hardware abstraction layer comprises means for activating an audio-hardware-independent shared library of the computing device.

Example 32 includes the subject matter of any of Examples 28-31, and further comprising means for outputting, with the physical audio output device, audio data associated with the current application framework in response to selecting the physical audio output device; and means for sleeping for a duration of the audio data associated with the current application framework in response to selecting the null audio output device.

Example 33 includes the subject matter of any of Examples 28-32, and wherein the physical audio device comprises a speaker.

Example 34 includes the subject matter of any of Examples 28-33, and wherein the physical audio device comprises a universal serial bus audio interface.

Example 35 includes the subject matter of any of Examples 28-34, and wherein the physical audio device comprises a Bluetooth audio interface.

Example 36 includes the subject matter of any of Examples 28-35, and wherein the means for executing the plurality of application framework instances comprises means for executing a plurality of managed execution environments, wherein each of the application framework instances corresponds to a managed execution environment.

Example 37 includes the subject matter of any of Examples 28-36, and further comprising means for executing an operating system kernel; wherein the means for executing the plurality of application framework instances comprises means for executing the plurality of application framework instances by the operating system kernel.

Example 38 includes the subject matter of any of Examples 28-37, and further comprising means for outputting, in response to selecting the physical audio output device, audio data associated with the current application framework with a kernel audio driver associated with the physical audio output device.

Example 39 includes the subject matter of any of Examples 28-38, and wherein the means for selecting the null audio output device comprises means for activating a null audio hardware abstraction layer of the computing device, wherein the null audio hardware abstraction layer comprises a shared library of the computing device that is independent from the kernel audio driver.

The invention claimed is:

1. At least one non-transitory storage device comprising instructions that, when executed, cause at least one processor to at least:
   execute a first application within a first application framework instance including a first hardware abstraction layer (HAL), the first application having a first application interface that is displayed on a screen;

execute a second application within a second application framework instance including a second HAL, the second application framework instance and the second HAL separate from the first application framework instance and the first HAL, the second application having a second application interface that is not displayed on the screen;
determine that the first application interface of the first application within the first application framework instance is displayed on the screen;
determine that the second application interface of the second application within the second application framework instance is not displayed on the screen;
route the audio via the first HAL between the first application and an electronic audio device when the first application interface of the first application is displayed on the screen; and
route null audio via the second HAL between the second application and the electronic audio device when the second application is not displayed on the screen.

2. The at least one storage device of claim 1, wherein the instructions cause the at least one processor to implement an Android operating system.

3. The at least one storage device of claim 1, wherein the instructions cause the at least one processor to route silent audio between the second application and the electronic audio device when the second application interface is not a foreground interface.

4. The at least one storage device of claim 1, wherein the first application interface is a foreground interface when the first application interface is displayed on the screen.

5. The at least one storage device of claim 1, wherein the instructions cause the at least one processor to route the audio between the second application and a null audio device within the second application framework instance when the second application interface is not displayed on the screen.

6. The at least one storage device of claim 1, wherein the instructions cause the at least one processor to determine whether the first application interface is displayed on the screen in response to an application framework instance switch.

7. The at least one storage device of claim 1, wherein the instructions cause the at least one processor to not route the audio between the first application and the electronic audio device when the first application is not displayed on the screen.

8. The at least one storage device of claim 7, wherein the instructions cause the at least one processor to route the audio between the second application and the electronic audio device when the second application interface of the second application is displayed on the screen.

9. A mobile device comprising:
an audio device;
a display screen;
wireless communication circuitry;
at least one memory;
at least one processor to execute machine-readable instructions to:
execute a first application within a first application framework instance including a first hardware abstraction layer (HAL), the first application having a first application interface displayed on a screen;
execute a second application within a second application framework instance including a second HAL, the second application framework instance and the second HAL separate from the first application framework instance, the second application having a second application interface not displayed on the screen;
determine that the first application interface of the first application within the first application framework instance is displayed on the screen;
determine that the second application interface of the second application within the first application framework instance is not displayed on the screen;
route the audio via the first HAL between the first application and the audio device when the first application interface of the first application is displayed on the screen; and
route null audio via the second HAL between the second application and the audio device when the second application is not displayed on the screen.

10. The mobile device of claim 9, wherein the at least one processor is to implement an Android operating system on the mobile device.

11. The mobile device of claim 9, wherein the at least one processor is to route silent audio when the second application interface is not displayed on the screen.

12. The mobile device of claim 9, wherein the at least one processor is to route the audio between the first application and the audio device when the application is displayed on the screen.

13. The mobile device of claim 9, wherein the at least one processor is to route the audio between the second application and a null audio device within the second application framework instance when the application interface is not displayed on the screen.

14. The mobile device of claim 9, wherein the at least one processor is to determine that the first application interface is displayed on the screen in response to an application framework instance switch.

15. The mobile device of claim 9, wherein the at least one processor is to not route the audio between the first application and the audio device when the first application is not displayed on the screen.

16. The mobile device of claim 15, wherein the at least one processor is to route the audio between the second application and the audio device when the second application interface of the second application is displayed on the screen.

17. A method to be performed by a mobile electronic device, the method comprising:
executing a first application within a first application framework instance including a first hardware abstraction layer (HAL), the first application having a first application interface that is displayed on a screen;
executing a second application within a second application framework instance including a second HAL, the second application framework instance and the second HAL separate from the first application framework instance and the first HAL, the second application having a second application interface that is not displayed on the screen;
determining that the first application interface of the first application within the first application framework instance is displayed on the screen;
determining that the second application interface of the second application is not displayed on the screen;
causing the audio to be routed between the first application and an electronic audio device when the first application interface of the first application is displayed on the screen; and routing null audio via the second HAL between the second application and the electronic audio device when the second application is not displayed on the screen.

18. The method of claim 17, further including routing silent audio between the second application and the electronic audio device when the second application interface is not a foreground interface.

19. The method of claim 17, wherein the first application interface is a foreground interface when the first application interface is displayed on the screen.

20. The method of claim 17, further including routing the audio between the second application and a null audio device within the second application framework instance when the second application interface is displayed on the screen.

21. The method of claim 17, wherein the determining of whether the first application interface is displayed on the screen in response to an application framework instance switch.

22. The method of claim 17, further including implementing an Android operating system on the mobile electronic device.

23. At least one non-transitory storage device comprising instructions that, when executed, cause at least one processor to at least:
- execute a first application within a first application framework instance including a first hardware abstraction layer (HAL), the first application having a first application interface, the first application interface having a foreground state and a background state;
- execute a second application within a second application framework instance including a second HAL, the second application framework instance and the second HAL separate from the first application framework instance and the first HAL, the second application having a second application interface, the second application interface having a foreground state and a background state;
- determine that the first application interface of the first application within the first application framework instance is in the foreground state;
- determine that the second application interface of the second application within the second application framework instance is in the background state;
- cause the audio to be routed via the first HAL between the first application and an electronic audio device when the first application interface of the first application is in the foreground state;
- causing null audio to be routed via the second HAL between the first application and the electronic audio device when the first application interface is in the background state;
- cause the audio to be routed via the first HAL between the second application and the electronic audio device when the second application interface of the second application is in the foreground state; and
- causing null audio to be routed via the second HAL between the second application and the electronic audio device when the second application interface is in the background state.

24. The at least one storage device of claim 23, wherein the instructions cause the at least one processor to implement an Android operating system.

25. The at least one storage device of claim 23, wherein the instructions cause the at least one processor to route silent audio between the second application and the electronic audio device when the second application interface is not a foreground interface.

26. The at least one storage device of claim 23, wherein the first application interface is a foreground interface when the first application interface is displayed on a screen.

27. The at least one storage device of claim 23, wherein the instructions cause the at least one processor to route the audio between the second application and a null audio device within the second application framework instance when the second application interface is not displayed on a screen.

28. The at least one storage device of claim 23, wherein the instructions cause the at least one processor to determine whether the first application interface is displayed on a screen in response to an application framework instance switch.

* * * * *